July 25, 1944.  W. S. BRINK  2,354,439
METHOD OF MAKING DISK WHEELS
Original Filed Feb. 28, 1939
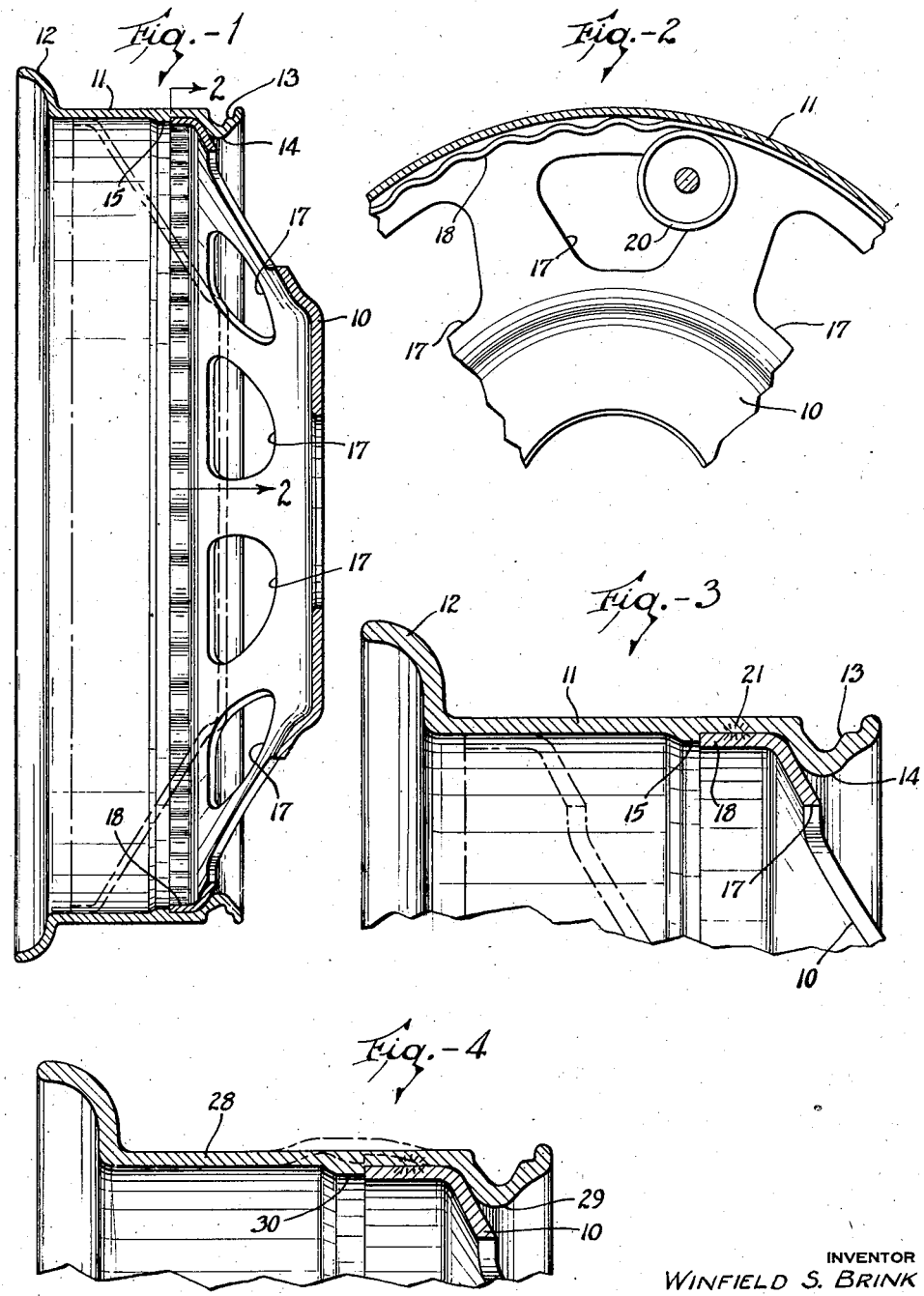
INVENTOR
WINFIELD S. BRINK
BY
ATTORNEYS Patented July 25, 1944

2,354,439

UNITED STATES PATENT OFFICE 2,354,439

METHOD OF MAKING DISK WHEELS

Winfield S. Brink, Akron, Ohio, assignor to The Firestone Tire & Rubber Company, Akron, Ohio, a corporation of Ohio Original application February 28, 1939, Serial No. 258,911. Divided and this application December 29, 1941, Serial No. 424,694

1 Claim. (Cl. 29—159.01)

This invention relates to the manufacture of disk wheels of the type that have a rim for pneumatic tires permanently affixed to the perimeter thereof, and more especially it relates to methods of making disk wheels of the character mentioned having the tire rim secured to the wheel disk in an improved manner.

The chief objects of the invention are to provide a method of wheel and rim construction wherein the rim is attached to the wheel in a superior manner; to provide a method of wheel construction of the character mentioned wherein the wheel is capable of absorbing considerable stress without deforming; to insure against loosening of the rim on the wheel; and to provide a method of making a disk wheel and rim assembly that does not require the use of rivets. A more specific object is to provide a method of wheel and rim construction of the character mentioned wherein the wheel disk is under normal compressive stress. Other objects will be manifest as the specification proceeds.

This application is a division of my co-pending U. S. application for Letters Patent, Serial No. 258,911, filed February 28, 1939.

Of the accompanying drawing:

Figure 1 is a diametric section through a disk wheel and rim assembly constituting the product of the method of the invention, showing an intermediate step in the manufacture thereof;

Figure 2 is a section on the line 2—2 of Figure 1, showing how the periphery of the disk is forced into engagement with the rim during a subsequent phase of manufacture;

Figure 3 is a fragmentary diametric section of the wheel and rim assembly in final form; and Figure 4 is a fragmentary diametric section of the product of the invention showing a modification of the method of making the same.

Referring now to Figures 1 to 3 of the drawing, there is shown a wheel construction comprising a wheel disk 10 and a rim 11 for pneumatic tire casings. The said tire rim is of the well known type that has an integral radial tire-engaging flange 12 on one margin thereof, and a gutter 13 on the other margin thereof for receiving a removable tire-engaging flange or ring (not shown). The gutter 13 is disposed inwardly of the periphery of the rim, being formed in a circumferential thickened portion 14 that extends inwardly of the inner circumference of the rim. Laterally of the marginal portion 14, toward the middle of the rim, the latter is formed on its inner circumference with a low circumferential rib or shoulder 15. The lateral face of rib 15 that confronts the portion 14 is flat and parallel to the plane of the rim, whereas the other lateral face of the rib is oblique or sloped. The wheel disk 10 is of concavo-convex or dished construction, and formed with a plurality of apertures 17, 17 to lighten its weight. The disk 10 is formed with a peripheral flange 18 that extends laterally parallel to the axis of the wheel. Initially the outside diameter of the flange 18 is slightly larger than the inside diameter of the rim 11, and the flange is transversely corrugated, as is best shown in Figure 2.

In the assembling of the disk 10 and rim 11, the disk is telescoped within the rim by moving it axially of the latter from the side thereof that includes flange 12, toward the opposite side thereof, the disk being slightly compressed by reason of its outside diameter being slightly larger than the inside diameter of the rim. The disk is moved axially of the rim until it is past the rib or shoulder 15 of the latter, the flange 18 being of such width as to fit nicely between the rib 15 on one side, and the inwardly projecting portion 14 of the rim on the other side. After the rim and disk have been assembled as described, the corrugated flange 18 is flattened outwardly against the rim, a roller 20, as shown in Figure 2, or any other suitable mechanical means, being used for this purpose. Thereafter, the rim and disk may be permanently connected to each other by spot welding as indicated at 21, Figure 3. In Figures 1 and 3 the position of the disk with relation to the rim during the initial phase of assembly is indicated in broken lines.

As an alternative method of assembling the disk 10 and rim 11, the latter is heated before assembly and the disk is telescoped therewith while the rim is hot. This so expands the rim that the disk is not subjected to compressive stress while being telescoped therewith, and readily passes the rib or shoulder 15. Upon subsequent cooling the rim shrinks onto the disk and has a tight fit therewith. The assembling is completed by spot welding as in the previously described method. In the practice of the alternative method it is not necessary to corrugate the flange 18 of the disk.

The embodiment of the invention shown in Figure 4, in its completed form, is identical with that shown in Figures 1 to 3 of the drawing. It comprises a wheel disk 10, and a rim 28, the latter being formed with the usual marginal inwardly extending portion 29, and inwardly extending circumferential rib or shoulder 30, the perimeter of the disk being confined between said portion 29 and the shoulder 30. In the manufacture of the rim 28, the rim section is hot rolled with the rib 30 and adjacent region of the rim disposed radially outwardly, as indicated in broken lines in the drawing, so that the internal diameter of said rib is flush with the major portion of the rim base. After the wheel disk is pressed into place against the inwardly extending portion 29 of the rim, the rim is cold rolled or bull-dozed so that the tire seat on the outer face of the rim is transversely flat as shown in full lines in the drawing. This forces the shoulder 30 and adjacent portion of the rim radially inwardly to provide a lateral abutment for one side of the wheel disk, and also places the latter under compressive stress. The disk and rim thereafter are united by spot welding as previously described.

The invention provides a vehicle wheel that is strong and durable, and which does not require the use of rivets. In both embodiments of the invention the disk is under compressive stress and thereby is capable of absorbing considerable strain and deformation without loosening of the rim and disk.

Other modifications may be resorted to without departing from the spirit of the invention, or the scope thereof as defined by the appended claim.

What is claimed is:

The method of making disk wheels which comprises providing a wheel disk having a corrugated laterally projecting peripheral flange, forcing said wheel disk into telescoping relation with a circumscribing rim member of slightly smaller size so that the disk flange engages the inner surface of the tire rim, and then deforming said flange by forcing it radially outwardly to flatten the corrugations thereof and bring the flange flush into engagement with the inner surface of the tire rim.

WINFIELD S. BRINK.